United States Patent
Bergin et al.

(10) Patent No.: US 6,593,875 B2
(45) Date of Patent: Jul. 15, 2003

(54) SITE-SPECIFIC DOPPLER NAVIGATION SYSTEM FOR BACK-UP AND VERIFICATION OF GPS

(75) Inventors: Jameson Bergin, Arlington, MA (US); J. Doss Halsey, Falls Church, VA (US); John Don Carlos, San Diego, CA (US)

(73) Assignee: Information Systems Laboratories, Inc., Vienna, VA (US)

( * ) Notice: Subject to any disclaimer, the term of this patent is extended or adjusted under 35 U.S.C. 154(b) by 0 days.

(21) Appl. No.: 09/895,613

(22) Filed: Jun. 29, 2001

(65) Prior Publication Data

US 2003/0102999 A1 Jun. 5, 2003

(51) Int. Cl.[7] .............................................. G01S 13/08
(52) U.S. Cl. .......................... 342/121; 342/64; 342/65; 342/107; 342/120; 342/123
(58) Field of Search ........................ 342/65, 64, 107, 342/108, 120, 121, 123

(56) References Cited

U.S. PATENT DOCUMENTS

| | | | |
|---|---|---|---|
| 2,412,003 A | * 12/1946 | Neufeld | 244/180 |
| 3,333,263 A | * 7/1967 | Kazakevicius et al. | 342/179 |
| 3,362,024 A | * 1/1968 | Badewitz | 342/107 |
| 3,649,125 A | * 3/1972 | Lehmann | 356/28 |
| 3,652,836 A | * 3/1972 | Richardson et al. | 701/203 |
| 4,728,959 A | 3/1988 | Maloney | |
| 5,355,316 A | * 10/1994 | Knobbe | 701/220 |
| 5,534,876 A | 7/1996 | Erickson | |
| 5,583,517 A | 12/1996 | Yokev | |
| 5,596,330 A | 1/1997 | Yokev | |
| 5,928,309 A | * 7/1999 | Korver et al. | 342/359 |
| 5,999,131 A | 12/1999 | Sullivan | |
| 2002/0188386 A1 | * 12/2002 | Day | 701/4 |

OTHER PUBLICATIONS

Pete Daum et al. "Aided Inertial LAnd Navigation System (ILANA) with a Minimum Set of Inertial Sensors" 1994 IEEE, 284–291.*

* cited by examiner

Primary Examiner—Thomas H. Tarcza
Assistant Examiner—Isam Alsomiri
(74) Attorney, Agent, or Firm—Nydegger & Associates

(57) ABSTRACT

A system and method for identifying the position of an airborne platform on a flight path includes at least three radar transceivers that are directed along respective beam paths to generate return signals. Each of the return signals respectively indicate a speed and a direction of the platform relative to points on the surface of the earth. A computer uses the return signal to establish a ground speed, an altitude and a direction of flight for the platform. This information is then used to identify the position of the platform on its flight path. Additionally, the system can include a last known position, or a site-specific radar clutter model, to establish a start point for the platform. The computer can then calculate the position of the platform relative to the start point.

19 Claims, 1 Drawing Sheet

SITE-SPECIFIC DOPPLER NAVIGATION SYSTEM FOR BACK-UP AND VERIFICATION OF GPS

FIELD OF THE INVENTION

The present invention pertains generally to navigation systems for airborne platforms such as aircraft. More particularly, the present invention pertains to pulse Doppler radars and radar altimeters that can be operationally combined to establish an effective airborne navigation system. The present invention is particularly, but not exclusively, useful as a back-up system for a GPS navigational system, and for stand-alone use in specific applications such as terrain avoidance.

BACKGROUND OF THE INVENTION

GPS (i.e. a Global Positioning System) is a satellite-based radio navigation, positioning and time transfer system that provides highly accurate navigational information on a continuous global basis to an unlimited number of properly-equipped users. Important aspects of the system are that GPS is unaffected by weather, and it provides a worldwide common grid reference system that is based on an earth-fixed coordinate system. Nevertheless, despite these beneficial aspects, GPS is susceptible to system outages, and it can be jammed.

For flight missions that require accurate position identification and precise navigational information for an airborne platform (e.g. an aircraft), GPS is an extremely effective tool. Due to the susceptibilities noted above, however, GPS should not be relied upon as a stand-alone navigational system. Stated differently, redundancy is a desirable attribute for any airborne navigational system. With this in mind, several advantages for having a back-up navigational system for GPS can be considered. First, the back-up system should be able to effectively assume the role of the primary system (i.e. GPS) when the latter becomes inoperative or inoperable. Second, and perhaps equally important, a back-up system can be used to verify the operation of the primary system. Third, a back-up system can be particularly valuable if it is also able to provide additional information, such as terrain avoidance actions, that may not otherwise be provided by the primary navigation system.

An important attribute for a back-up navigational system is that it be able to operate independently of the primary system it is intended to support. Preferably, such a back-up system not only operates independently of the primary system, it also relies on different physical phenomena for its functionality. This latter attribute is particularly important when jamming of the primary system (e.g. GPS) is a distinct possibility. Vis-a-vis GPS, a Doppler navigation system is an attractive candidate for use as a back-up to an airborne GPS system for several reasons.

Unlike an airborne GPS system, which requires external communication with earth orbiting satellites, a Doppler navigation system can be entirely contained inside the airborne platform (aircraft). Thus, a Doppler system is not particularly vulnerable to radio interference or hostile jamming. Also, unlike an airborne GPS system, a Doppler system need not be an "all or nothing at all" system. This is so because a Doppler system can easily include several functional components that are each capable of independent operation. Thus, such a system has several inherent advantages. For one there can be a built-in redundancy that makes operation possible, even though some components of the system are inoperative or inoperable. Further, the use of independently operating components allows the system to be specifically tailored for the particular needs of the system application. Also, as is well known, in a Doppler system each individual radar beam is capable of providing both distance (time delay) and speed (frequency shift) information. Thus, similar information from different geometric perspectives can be combined to provide additional information.

In light of the above it is an object of the present invention to provide a system for identifying the position of an airborne platform that can serve as a precise and accurate back-up navigational system for a GPS system. Another object of the present invention is to provide a system for identifying the position of an airborne platform that can function as a stand-alone system using only internal, platform-mounted equipment. Still another object of the present invention is to provide a system for identifying the position of an airborne platform that, in addition to an airborne navigation mission, is also capable of performing specialty missions such as terrain avoidance. Yet another object of the present invention is to provide a system for identifying the position of an airborne platform that is relatively easy to manufacture, is simple to use, and is comparatively cost effective.

SUMMARY OF THE PREFERRED EMBODIMENTS

A radar system for identifying the position of an airborne platform on a flight path is mounted on the platform to direct an "n" number of radar beams on respective predetermined paths toward the surface of the earth. The intent here is to generate an "n" number of return signals. For the present invention, "n" will generally be greater than or equal to three, and each return signal will contain information about the distance and speed of the platform relative to a point on the surface of the earth. The system also includes a computer that uses the "n" number of return signals to compute a ground speed, a direction of flight, and an altitude for the platform. These individual bits of information, together with information about the start point of the platform, are then collectively used to identify the position of the platform on its flight path.

For one embodiment of the present invention the system uses a single radar which sequentially directs its radar beam along the "n" predetermined beam paths. In another embodiment, a separate radar transceiver is used for each of the "n" beams. For both embodiments, one of the radar beam paths is preferably oriented in a direction that is forward of the platform (aircraft) and downward at an angle α from the flight path of the platform (aircraft). This same beam path is also directed laterally from the flight path of the platform at a positive angle β. Another radar beam is similarly oriented, but it is directed laterally at a negative angle β from the flight path of the platform. For this second embodiment, still another transceiver directs a radar beam along a beam path that is substantially perpendicular to the earth's surface.

With the arrangement of the radar beam paths disclosed above, the (at least three) return signals can be used by the computer using well known mathematical techniques to solve for the ground speed of the platform (aircraft), its altitude, and any change in the direction of flight for the platform. Together, this information can then be combined and continuously updated to identify the position of the platform on its flight path, relative to a known start point.

A start point for the platform can be established in either of two ways. When the system of the present invention is being used as a back-up system for a GPS navigational system, the last computed GPS position can be used as the start point. Alternatively, the start point can be established using a site-specific radar clutter model. As intended for the present invention, such a site-specific radar clutter model could be based on National Imagery and Mapping Agency (NIMA) Digital Terrain Elevation Data (DTED) and NIMA Digital Feature Analysis Data (DFAD). Additionally, and regardless whether an operative GPS navigational system is being used, it is envisioned for the present invention that the radar return signals will be matched with the site-specific radar clutter model. This is to be done for at least two reasons. First, the resultant information can be effectively used to generate a terrain-avoidance alarm. Second, the resultant information can be used to verify the proper operation of the GPS system. Further, even when the site-specific clutter model or a last GPS position is not known, it is to be appreciated that the system can still be used to determine the slope of the surface of the earth relative to the flight path. Importantly, the system is able to use this slope information to indicate a preferred flight path for terrain avoidance. As implied, this can be done even though the exact position of the aircraft may not be known.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
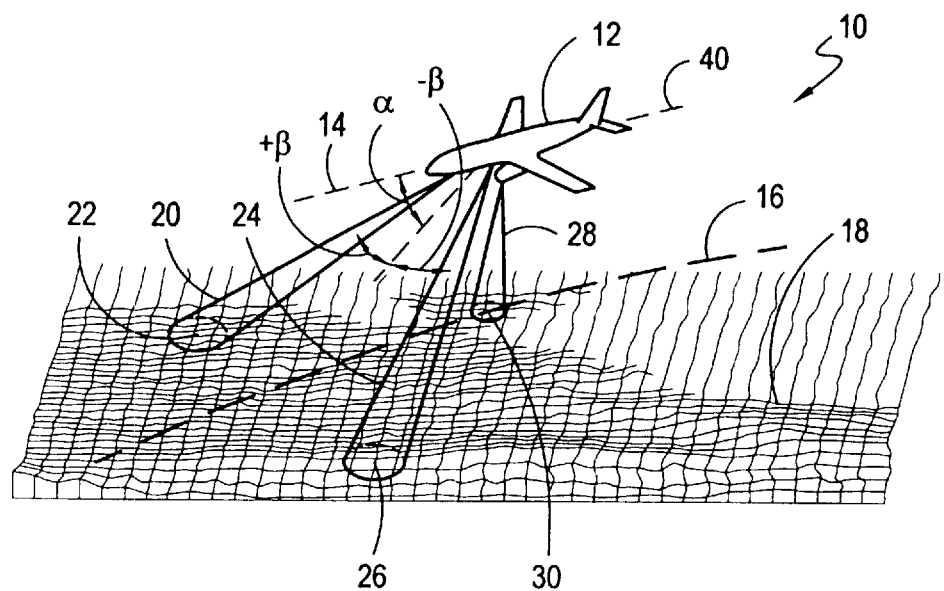
FIG. 1 is a perspective view of an airborne platform with an exemplary arrangement of radar beam paths shown for the present invention between the platform's flight path and the surface of the earth.

Referring initially to FIG. 1, a system for identifying the position of an airborne platform on a flight path in accordance with the present invention is shown, and is generally designated 10. More specifically, in FIG. 1 an airborne platform (aircraft) 12 is shown flying along its intended flight path 14. A projection 16 of the flight path 14 onto the surface of the earth 18 is also shown. As intended for the present invention, the system 10 is preferably to be used for determining an exact position of the aircraft 12 on the flight path 14 relative to the surface of the earth 18. At a minimum, the system 10 is intended to provide information about the surface of the earth 18 that can be used by personnel aboard the aircraft 12 for terrain avoidance purposes.

As indicated in FIG. 1, the system 10 implements several radar beams. More specifically, at least three such radar beams are employed. As shown, these beams are directed toward different points on the surface of the earth 18. In detail, the beam (beam path) 20 is directed toward a point (area) 22, the beam (beam path) 24 is directed toward a point (area) 26, and the beam (beam path) 28 is directed toward a point (area) 30. For the purposes of the system 10, the beams (beam paths) 20, 24 and 28 can be generated by a same transceiver and sequentially directed along the respective predetermined beam paths to points (areas) 22, 26 and 30. Alternatively, the beams (beam paths) 20, 24 and 28 can be generated by separate transceivers.

Figure 2:
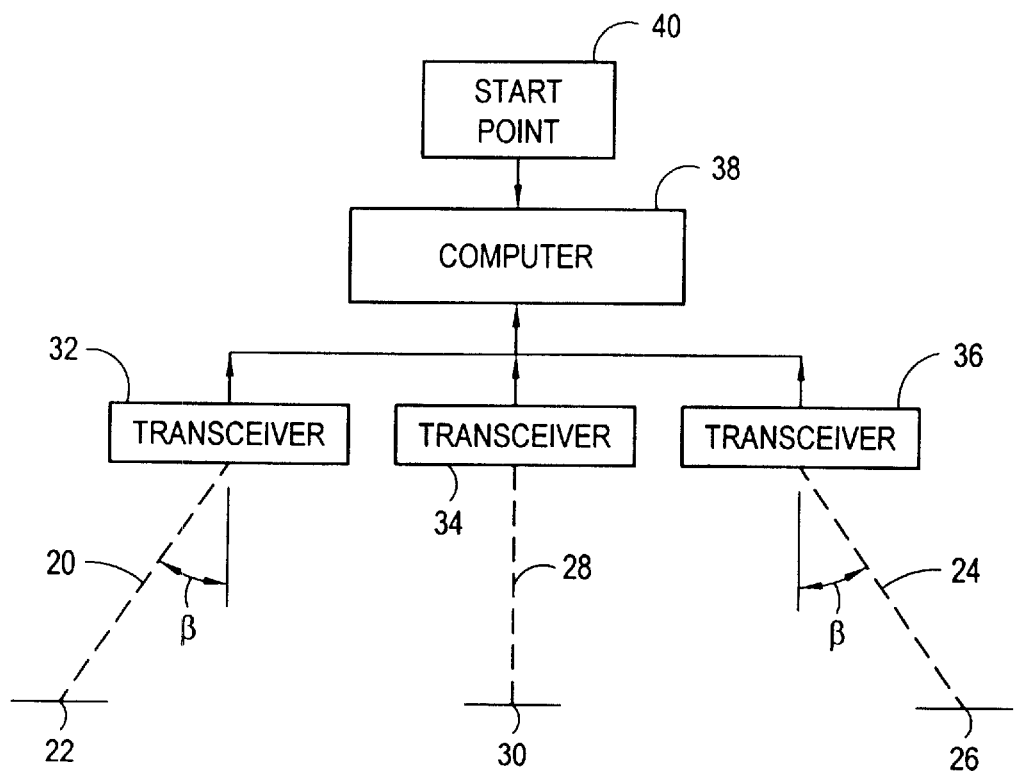
FIG. 2 is a schematic diagram of the cooperative components of a preferred embodiment for the system of the present invention.

FIG. 2 shows that for a multi-transceiver system 10, a transceiver 32 can be used to generate the radar beam (beam path) 20, a transceiver 34 can be used to generate the radar beam (beam path) 28 and a transceiver 36 can be used to generate the radar beam (beam path) 24. Preferably, all of the beams (beam paths) 20, 24 and 28 are capable of determining the distances from the aircraft 12 to the respective points (areas) 22, 26 and 30. Further, it is preferable that all of the beams (beam paths) 20, 24, and 28 are also capable of determining the respective speeds of the aircraft 12 relative to the respective points (areas) 22, 28 and 30. This information can then be fed to a computer 38 which will make appropriate computations to determine the ground speed, altitude and route of flight of the aircraft 12.

A preferred orientation for the beam paths 20, 24 and 28 is shown in FIG. 1. Specifically, as shown, the beam path 20 is oriented forward of the aircraft 12 and tilted downward from the flight path 14 at an angle $\alpha$. Also, the beam path 20 is angled laterally from the flight path 14 at a positive angle $\beta$. Similarly, the beam path 24 is oriented forward of the aircraft 12 and is tilted downward from the flight path 14 at the angle $\alpha$. The beam (beam path) 24, however, is angled laterally from the flight path 14 at a negative angle $\beta$. In the preferred embodiment for the present invention, the beam path 28 is directed so as to be substantially perpendicular to the surface of the earth 18. With these respective orientations, the transceivers 32 and 36 are preferably pulse Doppler radars, and the transceiver 34 is preferably a radar altimeter.

As contemplated for the system 10 of the present invention, the exact location of the aircraft 12 on its flight path 14 can be determined by its relationship with a known start point 40. Specifically, the start point 40 can be determined in either of two ways. First, the start point 40 can be taken as being the last location of the aircraft 12 as determined by GPS, or by some other primary navigation system. Second, the start point 40 can be taken relative to a site-specific radar clutter model that is pre-programmed into the computer 38. As intended for the present invention, such a site-specific radar clutter model could be based on National Imagery and Mapping Agency (NIMA) Digital Terrain Elevation Data (DTED) and NIMA Digital Feature Analysis Data (DFAD). Additionally, regardless whether an operative GPS navigational system is being used, it is envisioned for the present invention that the radar return signals will be matched with the site-specific radar clutter model for two reasons. First, the resultant information can be effectively used to generate a terrain-avoidance alarm. Second, the resultant information can be used to verify the proper operation of the GPS system.

In addition to its function as a back-up navigational system, the system 10 of the present invention can be used to determine the slope of the surface of the earth 18 relative to the flight path 14. Specifically, with this slope information, the computer 38 of system 10 can be used to indicate a preferred flight path for terrain avoidance. This can be done, even when the exact position of the aircraft 12 may not be known.

While the particular Site-Specific Doppler Navigation System for Back-up and Verification of GPS as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for identifying a position of an airborne platform on a flight path which comprises:
- a radar means mounted on the platform for directing an "n" number of radar beams on respective predetermined paths toward the surface of the earth to generate an "n" number of return signals, wherein "n" is at least equal to three;
- an electronic means connected with said radar means for using said "n" number of return signals to compute a ground speed, a direction of flight and an altitude for the platform to identify the position of the platform on its flight path; and
- a computer means preprogrammed with site-specific radar clutter model data for matching with said return signals to establish a start point location on the flight path to determine a route of flight for the platform.

2. A system as recited in claim 1 wherein said radar means comprises:
- a first transceiver for generating a first return signal indicative of a first speed and a first distance of the platform relative to a first point on the surface of the earth;
- a second transceiver for generating a second return signal indicative of a second speed and a second distance of the platform relative to a second point on the surface of the earth; and
- a third transceiver for generating a third return signal indicative of a third speed and a third distance of the platform relative to a third point on the surface of the earth.

3. A system as recited in claim 2 wherein said electronic means compares said first return signal, said second return signal and said third return signal to each other, to determine a ground speed, an altitude, and any change in the direction of flight for the platform, to therewith identify the position of the platform on its flight path.

4. A system as recited in claim 2 wherein said electronic means compares said first return signal, said second return signal and said third return signal to each other, to determine a slope for the surface of the earth relative to the flight path of the platform to indicate a preferred flight path for terrain avoidance.

5. A system as recited in claim 2 wherein said first transceiver and said second transceiver are pulse Doppler radars.

6. A system as recited in claim 5 wherein said third transceiver is a radar altimeter.

7. A system as recited in claim 1 further comprising means for individually directing each of said "n" number of radar beams, in sequence, along said respective predetermined paths.

8. A system as recited in claim 1 wherein said electronic means computes the position of the platform relative to the start point.

9. A system as recited in claim 8 wherein said site-specific radar clutter model data is derived from National Imagery and Mapping Agency (NIMA) Digital Terrain Elevation Data (DTED).

10. A system as recited in claim 9 further comprising means for matching said return signals with said site-specific radar clutter model to generate a terrain-avoidance alarm.

11. A system as recited in claim 1 wherein one said predetermined path is oriented forward and downward from the flight path at an angle $\alpha$ and laterally therefrom at a positive angle $\beta$, and further wherein another said predetermined path is oriented forward and downward from the flight path at the angle $\alpha$ and laterally therefrom at a negative angle $\beta$.

12. A system for identifying a position of an airborne platform on a flight path which comprises:
- a radar means for detecting a projection of the flight path onto the surface of the earth, for determining a ground speed for the platform along the projection, and for establishing a vertical distance for the platform above the projection; and
- a computer means preprogrammed with site-specific radar clutter model data for matching with data from said radar means to establish a start point location and for using the projection, the ground speed and the vertical distance to identify the position of the platform on its flight path and further, for using the start point location on the flight path to determine a route of flight for the airborne platform.

13. A system as recited in claim 12 wherein said radar means comprises:
- a first transceiver mounted on the platform for directing a radar beam on a first path toward the surface of the earth to generate a first return signal, said first return signal being indicative of a first speed and a first distance of the platform relative to a first point on the surface of the earth;
- a second transceiver mounted on the platform for directing a radar beam on a second path toward the surface of the earth to generate a second return signal, said second return signal being indicative of a second speed and a second distance of the platform relative to a second point on the surface of the earth; and
- a third transceiver mounted on the platform for directing a radar beam on a third path toward the surface of the earth to generate a third return signal, said third return signal being indicative of a third speed and a third distance of the platform relative to a third point on the surface of the earth.

14. A system as recited in claim 13 wherein said computer means compares said first return signal, said second return signal and said third return signal to each other to establish the ground speed for the platform and the projection of the flight path onto the surface of the earth.

15. A system as recited in claim 14 wherein said first transceiver and said second transceiver are pulse Doppler radars and said third radar means is a radar altimeter.

16. A system as recited in claim 13 wherein said computer means compares said first return signal, said second return signal and said third return signal to each other, to determine a slope for the surface of the earth relative to the flight path of the platform to indicate a preferred flight path for terrain avoidance.

17. A system as recited in claim 13 wherein said predetermined path for said first transceiver is forward looking and is oriented downward from the flight path at an angle $\alpha$ and away from the direction of flight at a positive angle $\beta$, and further wherein said predetermined path for said second transceiver is forward looking and is oriented downward from the flight path at an angle $\alpha$ and away from the direction of flight at a negative angle $\beta$.

18. A method for identifying a position of an airborne platform on a flight path which comprises the steps of:
- directing a first radar beam on a predetermined path to generate a first return signal, said first return signal being indicative of a first speed and a first distance of the platform relative to a first point on the surface of the earth;

directing a second radar beam on a predetermined path to generate a second return signal, said second return signal being indicative of a second speed and a second distance of the platform relative to a second point on the surface of the earth;

directing a third radar beam on a predetermined path to generate a third return signal, said third return signal being indicative of a third speed and a third distance of the platform relative to a third point on the surface of the earth;

comparing said first return signal, said second return signal and said third return signal to each other to establish a ground speed, an altitude, and a direction of flight for the platform;

matching said first return signal, said second return signal and said third return signal with preprogrammed site-specific radar clutter model data to establish a start point location for the platform;

calculating the position of the platform relative to the start point location; and using the start point location on the flight path to determine a route of flight for the airborne platform.

19. A method as recited in claim 18 wherein said comparing step includes determining a slope for the surface of the earth relative to the flight path of the platform to indicate a preferred flight path for terrain avoidance.

* * * * *